June 26, 1951     H. J. HORN     2,558,296
BRAKE DRUM
Filed Sept. 1, 1948
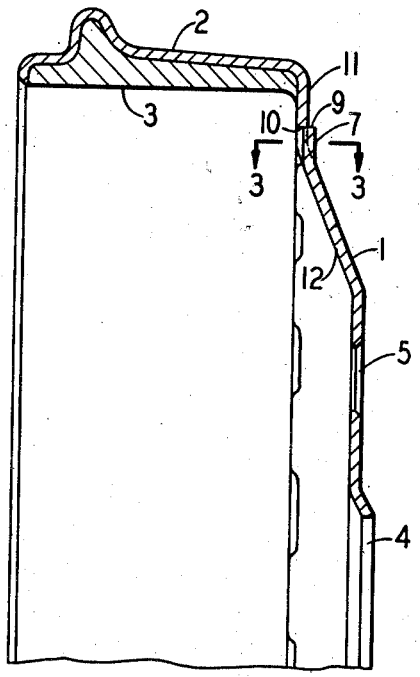
FIG. 1
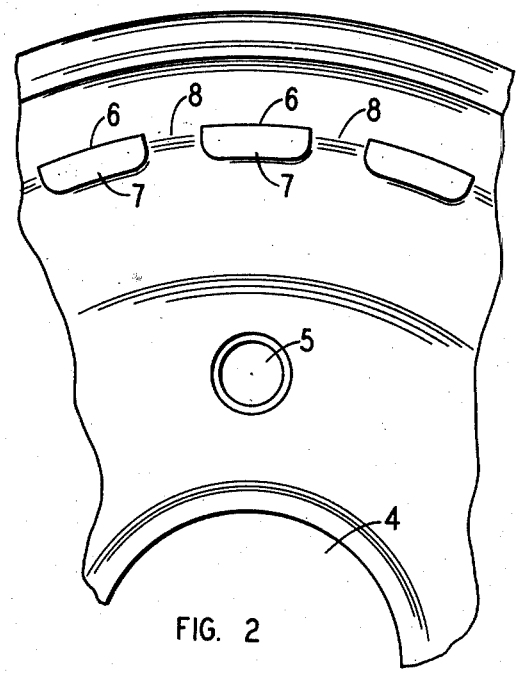
FIG. 2
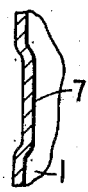
FIG. 3
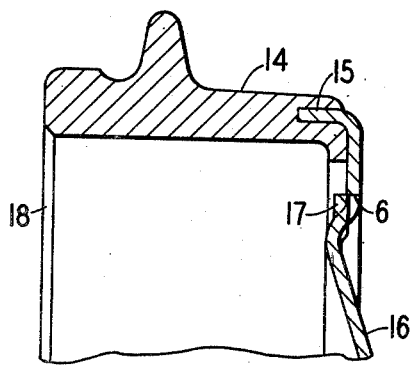
FIG. 4
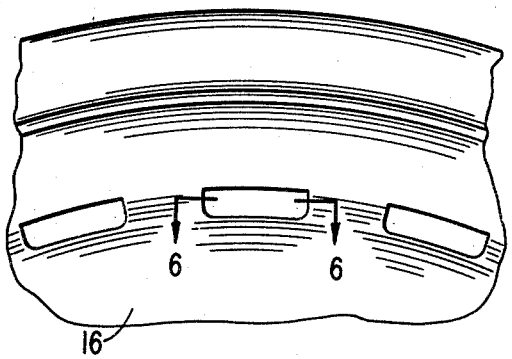
FIG. 5
FIG. 6
Inventor
HARRY J. HORN
By Barnes, Kisselle, Laughlin & Raisch
Attorneys Patented June 26, 1951

2,558,296

UNITED STATES PATENT OFFICE 2,558,296

BRAKE DRUM

Harry J. Horn, Lansing, Mich., assignor to Motor Wheel Corporation, Lansing, Mich., a corporation of Michigan Application September 1, 1948, Serial No. 47,272

2 Claims. (Cl. 188—218)

This invention relates to a brake drum.

It is common practice to make the brake ring and brake back integral either by forming the brake ring and brake back out of a single sheet of metal and centrifugally casting the braking surface or lining in the ring or by casting the ring about the peripheral portion of the brake back or by welding the ring to the back.

One difficulty that has been experienced with brake drums having a solid back is that the heat from the brake ring, when the brakes are applied, travels through the brake back so rapidly that the outer or open end of the brake drum reaches a higher temperature than that of the closed end of the ring adjacent the back and the open end of the ring expands to a greater extent than the closed end thereby causing the braking ring to bell-mouth. This is undesirable because it reduces the efficiency of the brake.

Another difficulty with brake drums having a solid back is that the heat from the brake ring, when the iron is cast to form the brake ring, travels through the back so rapidly that the iron adjacent the back chills much more rapidly than the iron forming the outer portion of the ring. This is undesirable because it sets up strains in the ring. A solid or imperforate brake drum back is desirable and is preferable from a cleanliness standpoint because any openings in the brake back permit dirt and water to get into the braking surface.

This invention contemplates a brake drum which obviates the above difficulties and has all the advantages of a brake drum with a solid or imperforate back. My brake drum prevents rapid heat transfer from the ring to the brake back both when the hot iron is cast to form the brake ring and when the brake is in service on a vehicle.

My invention also contemplates a brake drum which is very simple and which has a desirable limited structural flexibility in service due to the fact that the back in reality is of spoked formation.

In the drawings:

Fig. 1 is a fragmentary radial section through my brake drum and shows a brake drum where the back and outer part of the ring are made integral and of stamped sheet steel or other metal and the braking surface is cast centrifugally into the ring portion of the drum.

Fig. 2 is a fragmentary elevation showing the outside of my brake drum.

Fig. 3 is a section along the line 3—3 of Fig. 1.

Fig. 4 is a fragmentary radial section showing my invention incorporated in a brake drum where the braking ring is cast on to the peripheral edge of the brake back to thereby form an integral ring and back construction.

Fig. 5 is a fragmentary elevation of the outside of the drum shown in Fig. 4.

Fig. 6 is a section along the line 6—6 of Fig. 5.

Referring more particularly to the drawings, I have shown in Fig. 1 a brake drum comprising a back 1, brake ring 2 and an iron brake surface 3 cast centrifugally on to the inner surface of ring 2. Back 1 and ring 2 are integrally formed as a stamping of sheet steel or other suitable metal.

Brake back 1 is provided with a central opening 4 which receives the wheel hub (not shown) and is provided with a plurality of openings 5 through which bolts or rivets pass to secure the drum to the hub flange. The brake back 1 is sheared or cut through long lines 6. Lines 6 are spaced from each other and extend circumferentially about the center of the brake drum. Preferably, but not necessarily, shear cuts or lines 6 are concentric with the center of the drum.

The portion of the brake back 1 adjacent each shear or cut 6 and on the radially inner side of such cut 6 is bent axially outwardly a short distance. Thus, portions or areas 8 between the bent or offset portions 7 form what may be termed "spokes" and make the back 1 more flexible than if it were formed as a solid stamping without shear cuts 6. It should be noted, however, that the outwardly formed portions 7 are not bent outwardly a sufficient distance to form an opening through the back 1. The upper edge 9 of bent portion 7 overlaps the adjacent edge or face 10 of shear 6.

The shear or cuts 6 act as heat dams which prevent the transfer of heat across the sheared portion of the brake back. Thus, heat is transferred from the portion of the drum outwardly of shears 6 to the portion of the brake back radially inwardly of shear 6 only through spoke portions 8. The spoke portions 8 give sufficient structural strength to carry the load imposed upon the back 1 and form a heat path through which the heat from the braking ring is ultimately, but at a low rate, conducted to the central portion of the drum back.

It will be noted that the outer circumferential portion of the brake back 11 extends in a plane substantially perpendicular to the axis of the back and the adjacent circumferential area of the brake back 12 is inclined at an acute angle with respect to the plane of circumferential portion 11. Preferably the sheared offset portions 7 are located at the junction of portions 11 and 12 and this enhances the flexibility of the structure.

The brake drum shown in Figs. 4 to 6 differs from that shown in Fig. 1 in that the braking ring 14 is an iron casting and is cast about circumferential flange 15 on the sheet steel brake back 16. Back 16 is provided with circumferentially spaced shears or cuts 6 identical with those in the principal form of the invention but the area 17 adjacent each cut 6 and on the radially inner side thereof is bent or deformed axially toward the open end 18 of the brake drum rather than away from the open end as in the brake drum shown in Fig. 1. Thus, in each form of the invention the brake ring and back form an integral brake drum structure.

I claim:

1. In a brake drum comprising a braking ring and a back joined integrally thereto, a plurality of axially offset portions in said back circumferentially spaced adjacent said ring, said offset portions being struck out from the back and having their edges abutting and overlapping the adjacent edge portions of the back, said offset portions being sufficient in extent to retard transmission of heat to the central portion of the back to effect uniform heating of the brake ring during casting or braking.

2. The brake drum defined in claim 1 wherein said offset struck out portions are of substantially equal length and substantially equally spaced about the center of said back.

HARRY J. HORN.

REFERENCES CITED

The following references are of record in the file of this patent:

UNITED STATES PATENTS

| Number | Name | Date |
| --- | --- | --- |
| 1,944,261 | Mulhern | Jan. 23, 1934 |
| 2,016,871 | Nelson | Oct. 8, 1935 |
| 2,041,776 | Nelson | May 26, 1936 |